United States Patent
Mori

(10) Patent No.: US 6,790,511 B2
(45) Date of Patent: Sep. 14, 2004

(54) MAGNETIC RECORDING MEDIUM

(75) Inventor: Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 19 days.

(21) Appl. No.: 10/232,521

(22) Filed: Sep. 3, 2002

(65) Prior Publication Data

US 2003/0113586 A1 Jun. 19, 2003

(30) Foreign Application Priority Data

Sep. 4, 2001 (JP) ..................................... P.2001-267455

(51) Int. Cl.$^7$ .............................................. G11B 5/706
(52) U.S. Cl. .................. 428/141; 428/329; 428/409; 428/694 BR; 428/694 BP; 428/694 BH; 428/694 SG
(58) Field of Search ................................ 428/141, 329, 428/409, 694 BR, 694 BP, 694 BH, 694 SG

(56) References Cited

U.S. PATENT DOCUMENTS

| | | | | |
|---|---|---|---|---|
| 5,976,660 A | * | 11/1999 | Saito et al. | 428/65.3 |
| 6,017,605 A | * | 1/2000 | Yamazaki et al. | 428/65.3 |
| 6,291,052 B1 | * | 9/2001 | Takahashi et al. | 428/141 |
| 6,312,796 B1 | * | 11/2001 | Zinbo | 428/323 |

FOREIGN PATENT DOCUMENTS

| | | | |
|---|---|---|---|
| JP | 11025442 | * | 1/1999 |
| JP | 2000149243 | * | 5/2000 |

* cited by examiner

*Primary Examiner*—Stevan A. Resan
(74) *Attorney, Agent, or Firm*—Sughrue Mion, PLLC

(57) ABSTRACT

A magnetic recording medium comprising a support having thereon a substantially nonmagnetic lower layer and a magnetic layer containing a ferromagnetic hexagonal ferrite powder dispersed in a binder provided in this order, wherein the average tabular diameter of the ferromagnetic hexagonal ferrite powder is from 10 to 40 nm, and the friction coefficient of the magnetic layer against an SUS420J pole and a polyoxymethylene (POM) pole is from 0.15 to 0.50.

2 Claims, No Drawings

MAGNETIC RECORDING MEDIUM

FIELD OF THE INVENTION

The present invention relates to a coating type magnetic recording medium (i.e., a magnetic recording particulate medium) capable of high density recording. More specifically, the present invention relates to a coating type magnetic recording medium for high density recording which comprises a magnetic layer on a substantially non-magnetic lower layer wherein the magnetic layer contains a hexagonal ferrite fine powder.

BACKGROUND OF THE INVENTION

Magnetic heads working with electromagnetic induction as the principle of operation (an induction type magnetic head) are conventionally used and spread. However, magnetic heads of this type are approaching their limit for use in the field of higher density recording and reproduction. That is, it is necessary to increase the number of winding of the coil of a reproduction head to obtain larger reproduction output, but when the winding number is increased, the inductance increases and the resistance at high frequency heightens, as a result, the reproduction output lowers. In recent years, reproduction heads which work with MR (magneto-resistance) as the principle of operation are proposed and come to be used in hard discs. As compared with the induction type magnetic disc, several times of reproduction output can be obtained by the MR head. Further, since an induction coil is not used in the MR head, noises generated from instruments, e.g., impedance noises, are largely reduced, therefore, it becomes possible to obtain a great S/N ratio by lowering the noise coming from magnetic recording media. In other words, good recording and reproduction can be done and high density recording characteristics can be drastically improved by lessening the noise of magnetic recording media hiding behind the instruments. However, there is another problem that when the surface of media is smoothed for lessening the noise of magnetic recording media, the running property of magnetic recording media cannot be ensured.

SUMMARY OF THE INVENTION

An object of the present invention is to provide a coating type magnetic recording medium (i.e., a magnetic recording particulate medium) which is excellent in electromagnetic characteristics, markedly improved in a C/N ratio in high density recording region, excellent in productivity, can be produced inexpensively, and excellent in high density characteristics when used in a recording and reproducing system integrated with an MR head while maintaining running property and low in noise.

The above object of the present invention has been attained by a magnetic recording medium comprising a support having thereon a substantially nonmagnetic lower layer and a magnetic layer containing a ferromagnetic hexagonal ferrite powder dispersed in a binder provided in this order, wherein the average tabular diameter of the ferromagnetic hexagonal ferrite powder is from 10 to 40 nm, and the friction coefficient of the magnetic layer against an SUS420J pole and a polyoxymethylene (POM) pole is from 0.15 to 0.50.

The preferred modes of the present invention are as follows.

(1) The magnetic recording medium is a magnetic recording medium for reproduction with a magneto-resistance type magnetic head (an MR head), (2) The magnetic recording medium wherein the intensity of spatial frequency of 100/mm which is obtained by frequency analysis of the surface roughness of the magnetic layer is 10,000 $nm^3$ or less, and the intensity of spatial frequency of 500/mm is from 50 to 500 $nm^3$, and (3) The magnetic recording medium wherein the surface of the support has protrusions having a height of from 0.1 to 0.5 $\mu$m in number of from 0.01 to 0.5/$mm^2$.

DETAILED DESCRIPTION OF THE INVENTION

Hexagonal ferrite powders which are used in a magnetic layer in the present invention are tabular particles and the tabular diameter of hexagonal ferrite powders should be restrained to 10 to 40 nm. Further, the present invention can provide a magnetic recording medium improved in running durability and excellent in electromagnetic characteristics by restraining the friction coefficient of a magnetic layer against an SUS420J pole and a POM (polyoxymethylene) pole to 0.15 to 0.50.

When the friction coefficient of a magnetic recording medium is higher than 0.50, the reduction of running durability of the magnetic recording medium is actualized.

Further, the average tabular diameter of hexagonal ferrite powders for use in a magnetic layer is preferably from 20 to 35 nm, more preferably from 22 to 30 nm. When the average tabular diameter is higher than 40 nm, noise becomes large due to the hexagonal ferrite powders themselves and, in addition to that, a magnetic layer having excellent surface property which contributes to the reduction of noise is obtained with difficulty. While when the average tabular diameter is smaller than 10 nm, a sufficient dispersion solution cannot be obtained by the techniques of dispersion of the present time. The effect of the present invention becomes great by the average tabular diameter of hexagonal ferrite powders of from 10 to 40 nm.

It is preferred in the present invention that the intensity of spatial frequency of 100/mm which is obtained by frequency analysis of the surface roughness of the magnetic layer is 10,000 $nm^3$ or less, and the intensity of spatial frequency of 500/mm is from 50 to 500 $nm^3$.

When the intensity of spatial frequency of 100/mm is 10,000 $nm^3$ or more, electromagnetic characteristics are liable to be deteriorated. The intensity of spatial frequency of 100/mm is preferably 7,000 $nm^3$ or less, and more preferably 5,000 $nm^3$ or less. The lower limit of the intensity of the spatial frequency of 100/mm is not particularly limited and the smaller the better.

Further, when the intensity of spatial frequency of 500/mm is less than 50 $nm^3$, a friction coefficient is liable to become high, as a result, running durability shows a tendency to lower. While when the intensity of spatial frequency of 500/mm is higher than 500 $nm^3$, electromagnetic characteristics are liable to be deteriorated. The intensity of spatial frequency of 500/mm is preferably from 100 to 400 $nm^3$.

The reason that the intensity of spatial frequency (i.e., the power spectrum of density) or the distribution of the intensity influences electromagnetic characteristics and friction coefficient is not clear, but it is presumed due to the fact that the contact of an MR head and the medium is relaxed by that.

Several methods can be used to bring the friction coefficient into the range of the present invention, e.g., controlling the preparation of the coating solution forming a magnetic layer, controlling the conditions of calendering treatment, and controlling the protrusions on the surface of a support, are exemplified.

The present invention is preferably attained by the combination of the above methods. Of the above methods, it is preferred to select the average tabular diameter of a hexagonal ferrite powder and select the number of the surface protrusions of a support for controlling the intensity of spatial frequency (i.e., the power spectrum of density) of a magnetic layer.

The protrusions of the surface of a support for use in the present invention are preferably controlled so that protrusion density P of a height of from 0.1 to 0.5 μm comes to 0.01 to 0.5/mm$^2$. When P is more than 0.5/mm$^2$, electromagnetic characteristics are liable to be deteriorated, while when P is less than 0.01/mm$^2$, a friction coefficient is liable to increase due to the increment of a contact area.

Protrusion density P in the present invention is obtained by measuring the number of surface protrusions having a height of from 5 to 10 nm in the area of 225 μm$^2$ of a magnetic layer surface by an atomic force microscope (AFM).

The magnetic recording medium according to the present invention is described with every constituent element below.

Magnetic Layer

The magnetic recording medium according to the present invention may be provided with a magnetic layer on either one side of a support or may be provided on both sides. When a magnetic layer is provided on a lower layer, the magnetic layer (also called an upper layer or an upper magnetic layer) may be coated after the lower layer is coated and while the lower layer is still wet (W/W coating) or the magnetic layer may be coated after the lower layer coated is dried (W/D coating). Simultaneous or successive coating is preferred in view of the productivity but wet on dry coating can be sufficiently used in the case of a disc. In the multilayer construction according to the present invention, since the upper layer and the lower layer can be formed by simultaneous or successive coating (W/W coating), a surface treatment step, e.g., a calendering step, can be utilized effectively and surface roughness of the upper magnetic layer can be improved even the layer is an ultra-thin layer.

Hexagonal Ferrite Powder

Hexagonal ferrite powders which are used in the magnetic layer of the present invention are described below.

The examples of hexagonal ferrite powders include substitution products of each barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase, etc. Hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, nd, P, Co, Mn, Zn, Ni, Sr, B, Ge and Nb. In general, hexagonal ferrite powders containing the following elements, e.g., Co—Zn, Co—Ti, Co—Ti—Zr, Co—Ti—Zn, Ni—Ti—Zn, Nb—Zn—Co, Sb—Zn—Co and Nb—Zn can be used. According to starting materials and producing processes, specific impurities may be contained.

In particular, when reproduction is performed using a magneto-resistance head (an MR head) for increasing track density, it is necessary to reduce noise, but when the tabular diameter is smaller than 10 nm, stable magnetization cannot be obtained due to thermal fluctuation. While when the tabular diameter is more than 40 nm, noise increases, hence both of such particle diameters are not suitable for high density recording. An average tabular ratio (an arithmetic mean of tabular diameter/tabular thickness) is preferably from 1 to 15, more preferably from 1 to 7. If a tabular ratio is small, the packing density in a magnetic layer becomes high, which is preferred but satisfactory orientation cannot be obtained. If a tabular ratio is higher than 15, noise increases due to stacking among particles. The specific surface area ($S_{BET}$) measured by the BET method of the particles having diameters within this range is from 30 to 200 m$^2$/g. Specific surface areas nearly coincide with the values obtained by arithmetic operation values from tabular diameters and tabular thicknesses. Distribution of tabular diameter/tabular thickness is generally preferably as narrow as possible. Distributions of specific surface area in numerical values can be compared by measuring TEM photographs of 500 particles selected randomly. The distributions are in many cases not regular distributions, however, a variation coefficient expressed by the standard deviation to an average tabular diameter by computation (a/average tabular diameter or tabular thickness) is generally from 0.1 to 2.0. A variation coefficient is preferably from 0.1 to 1.0, and more preferably from 0.1 to 0.5. For obtaining narrow particle size distribution, it is efficient to make a particle-forming reaction system homogeneous as far as possible, and particles formed are subjected to distribution-improving treatments as well. For example, a method of selectively dissolving ultra-fine particles in an acid solution is also known.

The coercive force (Hc) measured in magnetic powders of generally from about 40 to about 400 kA/m can be produced. Higher Hc is advantageous for high density recording but it is restricted by the capacity of a recording head. Magnetic powders preferably have Hc of from about 159 to about 397 kA/m, and more preferably from 159 to 320 kA/m. When the saturation magnetization of a head is more than 1.4 tesla, Hc is preferably 175 kA/m or more. Hc can be controlled by particle diameters (tabular diameter/tabular thickness), the kinds and amounts of elements contained, the substitution sites of elements, and the reaction conditions of particle formation. Saturation magnetization is from 30 to 80 A·m$^2$/kg. Saturation magnetization has inclination of becoming smaller as particles become finer. For improving saturation magnetization, a method of reducing crystallization temperature or heat treatment temperature and time, a method of increasing the amount of the compound to be added, and a method of increasing the surface treating amount may be used in the production of hexagonal ferrite powders. W-type hexagonal ferrite can also be used. Further, when magnetic powders are dispersed, the particle surfaces of magnetic powders may be treated with substances compatible with the dispersion media and the polymers. Inorganic and organic compounds are used as surface treating agents. For example, oxides or hydroxides of Si, Al and P, various kinds of silane coupling agents, and various kinds of titanium coupling agents are primarily used. The amount of these surface treating agents is from 0.1 to 10 mass % (i.e., weight %) based on the amount of the magnetic powder. The pH of magnetic powders is also important for dispersion, and it is in general from 4 to 12. The optimal value of pH is dependent upon the polymer. Taking the chemical stability and the storage stability of magnetic media into consideration, pH of from about 6 to about 11 is selected. The water content in magnetic powders also affects dispersion. The optimal value of the water content is dependent upon the dispersion medium and the polymer, and the water content of from 0.01 to 2.0 mass % is selected in general.

Producing methods of hexagonal ferrite powders include the following and any of these methods can be used in the present invention: (1) a glass crystallization method comprising the steps of mixing metallic oxides which substitute barium oxide, iron oxide and iron with boron oxide as a glass-forming material so as to make a desired ferrite composition, melting and then quenching the mixture to obtain an amorphous product, subjecting the amorphous product obtained to reheating, washing and then pulverizing to obtain a barium ferrite crystal powder, (2) a hydrothermal reaction method comprising the steps of neutralizing a solution of a metallic salt having barium ferrite composition with an alkali, removing the byproducts produced, heating the liquid phase at 100° C. or more, washing, drying and then pulverizing to thereby obtain a barium ferrite crystal powder, and (3) a coprecipitation method comprising the steps of neutralizing a solution of a metallic salt having barium ferrite composition with an alkali, removing the byproducts produced and drying, treating the system at 1,100° C. or less, and then pulverizing to obtain a barium ferrite crystal powder.

Lower Layer

The lower layer is described in detail below. The constitution of the lower layer in the present invention is not particularly limited so long as it is substantially nonmagnetic but, in general, the lower layer comprises at least a resin, preferably a powder, e.g., an inorganic or organic powder dispersed in a resin. The inorganic powder is, in general, preferably a nonmagnetic powder but a magnetic powder can also be contained so long as the lower layer is substantially nonmagnetic. "The lower layer is substantially nonmagnetic" means that the lower layer may be magnetic within the range of not substantially reducing the electromagnetic characteristics of the upper layer.

Nonmagnetic powders can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred. These nonmagnetic powders preferably have an average particle size of from 0.005 to 2 $\mu$m. A plurality of nonmagnetic powders each having a different particle size may be combined, if necessary, or a single nonmagnetic powder having a broad particle size distribution may be employed so as to attain the same effect as such a combination. A particularly preferred particle size of nonmagnetic powders is from 0.01 to 0.2 $\mu$m. In particular, when nonmagnetic powders are granular metallic oxides, the average particle size of the granular metallic oxides is preferably 0.08 $\mu$m or less, and when nonmagnetic powders are acicular metallic oxides, the long axis length of the acicular metallic oxides is preferably 0.3 $\mu$m or less, and more preferably 0.2 $\mu$m or less. Nonmagnetic powders for use in the present invention have a tap density of from 0.05 to 2 g/ml, and preferably from 0.2 to 1.5 g/ml; a water content of generally from 0.1 to 5 mass %, preferably from 0.2 to 3 mass %, and more preferably from 0.3 to 1.5 mass %; and a pH value of generally from 2 to 11, and particularly preferably from 3 to 10.

Nonmagnetic powders for use in the present invention have a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 $\mu$m, and more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, and preferably from 3 to 6. The figure of nonmagnetic powders may be any of acicular, spherical, polyhedral and tabular shapes. Nonmagnetic powders preferably have a Mohs' hardness of from 4 to 10. The SA (stearic acid) adsorption amount of nonmagnetic powders is from 1 to 20 $\mu$mol/m2, preferably from 2 to 15 $\mu$mol/m2, and more preferably from 3 to 8 $\mu$mol/m 2. The pH value of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are more preferred in the point of dispersibility, and $Al_2O_3$, $SiO_2$ and $ZrO_2$ are most preferred. These surface-covering agents can be used in combination or may be used alone. Surface treatment may be performed by coprecipitation, alternatively, surface treatment of particles may be previously performed to be covered with alumina in the first place, then the alumina-covered surface may be covered with silica, or vice versa, according to purposes. A surface-covered layer may be porous, if necessary, but a homogeneous and dense surface is generally preferred.

The specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha K.K.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-10° F. and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A, and calcined products of them (manufactured by Ube Industries, Ltd.). Particularly preferred nonmagnetic powders are titanium dioxide and alpha-iron oxide.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring and acetylene blacks can be used as carbon blacks. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of from 100 to 500 m²/g, and preferably from 150 to 400 m²/g, a DBP oil absorption amount of from 20 to 400 ml/100 g, and preferably from 30 to 400 ml/100 g, a particle size of from 5 to 80 nm, preferably from 10 to 50 nm, and more preferably from 10 to 40 nm, pH of from 2 to 10, a water content of from 0.1 to 10 mass %, and a tap density of from 0.1 to 1 g/ml. The specific examples of carbon blacks for use in the lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, M-600, MA-230, #4000 and #4010 (manufactured by Mitsubishi Chemical Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface may be graphitized before use. Carbon blacks may be previously dispersed in a binder before being added to a coating solution. Carbon blacks can be used within the range not exceeding 50 mass % based on the above inorganic powders and not exceeding 40 mass % based on the total weight of the nonmagnetic layer. These carbon blacks can be used alone or in combination. Regarding carbon blacks for use in the present invention, for example, the description in *Handbook of Carbon Blacks* (edited by Carbon Black Association of Japan) can be referred to.

Organic powders can be used in the lower layer according to the purpose. The examples of organic powders include an acryl styrene resin powder, a benzoguanamine resin powder, a melamine resin powder, and a phthalocyanine pigment. Besides the above, a polyolefin resin powder, a polyester resin powder, a polyamide resin powder, a polyimide resin powder, and a polyethylene fluoride resin powder can also be used. The producing methods of these resin powders are disclosed in JP-A-62-18564 and JP-A-60-255827 (the term "JP-A" as used herein means an "unexamined published Japanese patent application").

Binder resins, lubricants, dispersants, additives, solvents, dispersing methods, and others used for the magnetic layer described below can be used in the lower layer. In particular, with respect to the amounts and the kinds of binder resins, additives, the amounts and the kinds of dispersants, well-known prior art techniques regarding the magnetic layer can be applied to the lower layer.

Binder

Conventionally well-known thermoplastic resins, thermosetting resins, reactive resins and mixtures of these resins are used as a binder in the present invention. Thermoplastic resins having a glass transition temperature of from –100 to 150° C., a number average molecular weight of from 1,000 to 200,000, preferably from 10,000 to 100,000, and a polymerization degree of about 50 to about 1,000 can be used in the present invention.

The examples of such compounds include polymers or copolymers containing as a constituting unit the following compounds, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, published by Asakura Shoten. It is also possible to use well-known electron beam-curable type resins in each layer. The examples of these resins and producing methods are disclosed in detail in JP-A-62-256219. These resins can be used alone or in combination. The examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, and polycaprolactone polyurethane. Concerning every binder shown above, it is preferred that at least one polar group selected from the following groups is introduced by copolymerization or addition reaction for the purpose of further improving dispersibility and durability, e.g., —COOM, —SO$_3$M, —OSO$_3$M, —P=O(OM)$_2$, —O—P=O (OM)$_2$ (wherein M represents a hydrogen atom, or an alkali metal salt group), —OH, —NR$^2$, —N$^+$R$_3$ (R represents a hydrocarbon group), an epoxy group, —SH and —CN. The content of these polar groups is from $10^{-1}$ to $10^{-8}$ mol/g, and preferably from $10^{-2}$ to $10^{-6}$ mol/g.

The specific examples of binders for use in the present invention include VAGH, VYHH, VMCH, VAGF, VAGD, VROH, VYES, VYNC, VMCC, XYHL, YXSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dai-Nippon Ink & Chemicals, Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Chemical Corp.), Sunprene SP-150 (manufactured by Sanyo Chemical Industries Co. Ltd.), and Salan F310 and F210 (manufactured by Asahi Chemical Industry Co., Ltd.).

The amount of the binder for use in the lower layer and the magnetic layer according to the present invention is from 5 to 50 mass % (i.e., weight %), and preferably from 10 to 30 mass %, based on the amount of the nonmagnetic powder or the magnetic powder. When vinyl chloride resins are used as the binder, the amount is from 5 to 30 mass %, when polyurethane resins are used, the amount is from 2 to 20 mass %, and also it is preferred that polyisocyanate is used in an amount of from 2 to 20 mass % in combination with them. However, for instance, when head corrosion is caused by a slight amount of chlorine due to dechlorination, it is possible to use polyurethane alone or a combination of polyurethane and isocyanate. When polyurethane is used in the present invention, it is preferred that the polyurethane has a glass transition temperature of from −50 to 150° C., preferably from 0 to 100° C., breaking extension of from 100 to 2,000%, breaking stress of from 0.05 to 10 kg/mm² (0.49 to 98 MPa), and a yielding point of from 0.05 to 10 kg/mm² (0.49 to 98 MPa).

The magnetic recording medium in the present invention may comprise two or more layers. Accordingly, the amount of the binder, the amounts of the vinyl chloride resins, the polyurethane resins, the polyisocyanate or other resins contained in the binder, the molecular weight of each resin constituting the magnetic layer, the amount of the polar groups, or the above-described physical properties of resins can of course be varied in the lower layer and the magnetic layer, according to necessity. These factors should be rather optimized in each layer. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the lower layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity.

Carbon Black, Abrasive

The examples of carbon blacks for use in the magnetic layer according to the present invention include furnace blacks for rubbers, thermal blacks for rubbers, carbon blacks for coloring and acetylene blacks. Carbon blacks for use in the magnetic layer of the present invention have a specific surface area ($S_{BET}$) of from 5 to 500 m²/g, a DBP absorption of from 10 to 400 ml/100 g, an average particle size of from 5 to 300 nm, pH of from 2 to 10, a water content of from 0.1 to 10 mass %, and a tap density of from 0.1 to 1 g/ml. The specific examples of carbon blacks for use in the magnetic layer of the present invention include BLACKPEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Chemical Corp.), CONDUCTEX SC, RAVEN 150, 50, 40 and 15, RAVEN-MT-P (manufactured by Columbia Carbon Co., Ltd.), and Ketjen Black EC (manufactured by JAPAN EC Co., Ltd.). Carbon blacks for use in the present invention may previously be surface-treated with a dispersant, may be grafted with a resin, or a part of the surface may be graphitized before use. Carbon blacks may be previously dispersed in a binder before being added to a magnetic coating solution. These carbon blacks may be used alone or in combination. Carbon blacks are preferably used in an amount of from 0.1 to 30 mass % based on the amount of the magnetic powder. Carbon blacks can serve various functions such as preventing the static charge of a magnetic layer, reducing the friction coefficient, imparting a light-shielding property and improving film strength. Such functions vary depending upon the kind of carbon blacks to be used. Accordingly, it is of course possible in the present invention to select and determine the kinds, the amounts and the combinations of the carbon blacks to be added to the upper magnetic layer and the lower layer, on the basis of the above mentioned various properties such as the particle size, the oil absorption amount, the electroconductivity and the pH value, or these should be rather optimized in each layer. Regarding carbon blacks for use in the magnetic layer in the present invention, for example, compiled by Carbon Black Association, *Handbook of Carbon Blacks* can be referred to.

As the abrasive which are use in the present invention, well-known materials essentially having a Mohs' hardness of 6 or more may be used alone or in combination. The examples of such abrasives include alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so long as the content of the main component is 90 mass % or more. Abrasives preferably have an average particle size of from 0.01 to 2 μm, more preferably from 0.05 to 1.0 μm, and particularly preferably from 0.05 to 0.5 μm. In particular, for improving electromagnetic characteristics, abrasives having narrow particle size distribution are preferred. For improving durability, a plurality of abrasives each having a different particle size may be combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5 mass %, a pH value of from 2 to 11 and a specific surface area ($S_{BET}$) of from 1 to 30 m²/g. The figure of the abrasives for use in the present invention may be any of acicular, spherical and die-like shapes. Abrasive shaving a figure partly with edges are preferred, because a high abrasive property can be obtained. The specific examples of abrasives for use in the present invention include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenma K.K.), UB20 (manufactured by Uemura Kogyo K.K.), G-5, Chromex U2 and Chromex U1 (manufactured by Nippon Chemical Industrial Co., Ltd.), TF100 and TF140 (manufactured by Toda Kogyo Co., Ltd.), beta-Random and Ultrafine (manufactured by Ividen Co., Ltd.), and B-3 (manufactured by Showa Mining Co., Ltd.). These abrasives may be added to the lower layer, if necessary. By adding abrasives into the lower layer, it is possible to control the surface figure or prevent abrasives from protruding. The particle sizes and amounts of abrasives to be added to the magnetic layer and the lower layer should be selected independently at optimal values.

Additive

As additives which can be used in the magnetic layer and the lower layer of the present invention, those having a lubricating effect, an antistatic effect, a dispersing effect and a plasticizing effect may be used. The examples of additives which can be used in the present invention include molybdenum disulfide, tungsten disulfide, graphite, boron nitride, graphite fluoride, silicone oils, polar group-containing silicons, fatty acid-modified silicons, fluorine-containing silicons, fluorine-containing alcohols, fluorine-containing esters, polyolefins, polyglycols, alkyl phosphates and alkali metallic salts thereof, alkyl sulfates and alkali metallic salts thereof, polyphenyl ethers, phenylphosphonic acids, alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metallic salts thereof, monobasic fatty acids having from 10 to 24 carbon atoms (which may contain an unsaturated bond or which may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butyl stearate, octyl stearate, amyl stearate, isooctyl stearate, butylmyristate, octylmyristate, butoxyethyl stearate, butoxydiethyl stearate, 2-ethylhexyl stearate, 2-octyldodecyl palmitate, 2-hexyldodecyl palmitate, iso-hexadecyl stearate, oleyl oleate, dodecyl stearate, tridecyl stearate, oleyl erucate, neopentyl glycol didecanoate, and ethylene glycol dioleyl, and the examples of alcohols as additives include oleyl alcohol, stearyl alcohol and lauryl alcohol. In addition to the above compounds, the examples of other additives which can be used include nonionic surfactants, e.g., alkylene oxide, glycerol, glycidol or alkylphenol-ethylene oxide adducts; cationic surfactants, e.g., cyclic amines, ester amides, quaternary ammonium salts, hydantoin derivatives, heterocyclic compounds, phosphonium or sulfonium; anionic surfactants containing an acidic group such as carboxylic acid, sulfonic acid, phosphoric acid, a sulfate group or a phosphate group; and amphoteric surfactants, e.g., amino acids, aminosulfonic acids, sulfates or phosphates of amino alcohols, and alkylbetains. The details of these surfactants are described in *Handbook of Surfactants*, Sangyo Tosho Co., Ltd. These lubricants and antistatic agents need not be 100% pure and may contain impurities such as isomers, non-reacted products, byproducts, decomposed products and oxides, in addition to the main components. However, the content of such impurities is preferably 30% or less, and more preferably 10% or less.

The Lubricants and surfactants for use in the present invention respectively have different physical functions. The kinds, amounts and proportions of combination generating synergistic effect of these lubricants should be determined optimally in accordance with the purpose. For example, the lower layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in the lower layer is made larger than that in the magnetic layer so as to improve the lubricating effect of the surface. The examples are by no means limited thereto. In general, the total amount of the lubricants is from 0.1 to 50 mass %, and preferably from 2 to 25 mass %, based on the ferromagnetic powder in the magnetic layer or the nonmagnetic powder in the lower layer.

All or a part of the additives to be used in the present invention may be added to a magnetic coating solution or a nonmagnetic coating solution in any step of the preparation. For example, additives may be blended with a magnetic powder before the kneading step, may be added during the step of kneading a magnetic powder, a binder and a solvent, may be added during the dispersing step, may be added after the dispersing step, or may be added just before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment or after the completion of slitting.

Well-known organic solvents can be used in the present invention, for example, organic solvents disclosed in JP-6-68453 can be used.

Layer Construction

The thickness of the support in the magnetic recording medium according to the present invention is, for example, from 2 to 100 $\mu$m, and preferably from 2 to 80 $\mu$m. Particularly, the thickness of the support for a computer tape is from 3.0 to 6.5 $\mu$m, preferably from 3.0 to 6.0 $\mu$m, and more preferably from 4.0 to 5.5 $\mu$m.

An under coating layer (or a subbing layer) may be provided between the support and the lower layer for adhesion improvement. The thickness of the under coating layer is from 0.01 to 0.5 $\mu$m, and preferably from 0.02 to 0.5 $\mu$m. The magnetic recording medium in the present invention may be a disc-like medium comprising a lower layer and a magnetic layer provided on both surface sides of a support or may be a disc-like medium or a tape-like medium comprising a lower layer and a magnetic layer provided on either one surface side. When a lower layer and a magnetic layer are provided on only one surface side of a support, a back coating layer may be provided on the surface side of the support opposite to the side having the lower layer and the magnetic layer for the purpose of static charge prevention and curling correction. The thickness of a back coating layer is from 0.1 to 4 $\mu$m, and preferably from 0.3 to 2.0 $\mu$m. Well-known under coating layers and back coating layers can be used for this purpose.

The thickness of the magnetic layer of the magnetic recording medium of the present invention can be optimally selected according to the saturation magnetization amount of the head used, the head gap length, and the recording signal zone, and is preferably from 0.05 to 0.5 $\mu$m, more preferably from 0.1 to 0.25 $\mu$m. The magnetic layer may comprise two or more layers each having different magnetic characteristics and well-known multilayer magnetic layer structures can be applied to the present invention.

The thickness of the lower layer of the medium according to the present invention is generally from 0.2 to 1.0 μm, preferably from 0.3 to 3.0 μm, and more preferably from 1.0 to 2.5 μm. The lower layer of the recording medium in the present invention exhibits the effect of the present invention so long as it is substantially nonmagnetic even if, or intentionally, it contains a small amount of a magnetic powder as an impurity, which is as a matter of course regarded as essentially the same construction as in the present invention. The term "substantially nonmagnetic" means that the residual magnetic flux density of the lower layer is 0.01 T or less or the coercive force of the lower layer is 8 kA/m (100 Oe), preferably the residual magnetic flux density and the coercive force are zero.

Back Coating Layer

In general, a magnetic tape for a computer data recording is decidedly required to have an excellent repeating-running property as compared with a video tape and an audio tape. For maintaining such high running durability, it is preferred for a back coating layer to contain a carbon black and an inorganic powder.

Two kinds of carbon blacks each having different average particle size are preferably used in combination. In this case, a combined use of a fine carbon black having an average particle size of from 10 to 20 nm and a coarse carbon black having an average particle size of from 230 to 300 nm is preferred. In general, by the incorporation of a fine carbon black as above, the surface electrical resistance of a back coating layer and also light transmittance can be set at low values. Since there are many kinds of magnetic recording apparatuses making use of light transmittance of a tape and making it as signals of operation, the addition of fine carbon blacks is particularly effective in such a case. In addition, a fine carbon black is in general excellent in retention of a liquid lubricant and contributes to the reduction of a friction coefficient when lubricants are used in combination. On the other hand, a coarse carbon black having a particle size of from 230 to 300 nm has a function as a solid lubricant and forms minute protrusions on the surface of a back coating layer, to thereby contribute to reduce a contact area and a friction coefficient. However, a coarse carbon black has a drawback such that, when used alone, particles are liable to drop out from the back coating layer due to the tape sliding during severe running, which leads to the increase of the error rate.

The specific examples of fine carbon blacks commercially available include RAVEN 2000B (18 nm) and RAVEN 1500B (17 nm) (manufactured by Columbia Carbon Co., Ltd.), BP800 (17 nm) (manufactured by Cabot Co., Ltd.), PRINTEX90 (14 nm), PRINTEX95 (15 nm), PRINTEX85 (16 nm), PRINTEX75 (17 nm) (manufactured by Dgussa Corp.), and #3950 (16 nm) (manufactured by Mitsubishi Chemical Corp.).

The specific examples of coarse particle carbon blacks commercially available include THERMAL BLACK (270 nm) (manufactured by Cancarb Co., Ltd.) and RAVEN MTP (275 nm) (manufactured by Columbia Carbon Co., Ltd.).

When two kinds of carbon blacks each having different average particle size are used in combination in a back coating layer, the proportion of the contents (by weight) of a fine carbon black having a particle size of from 10 to 20 nm and a coarse carbon black having a particle size of from 230 to 300 nm is preferably the former/the latter of from 98/2 to 75/25, and more preferably from 95/5 to 85/15.

The content of a carbon black in a back coating layer (the total amount when two kinds are used) is generally from 30 to 80 weight parts, preferably from 45 to 65 weight parts, based on 100 weight parts of the binder.

It is preferred to use two kinds of inorganic powders each having different hardness. Specifically, a soft inorganic powder having a Mohs' hardness of from 3 to 4.5 and a hard inorganic powder having a Mohs' hardness of from 5 to 9 are preferably used in combination. By the addition of a soft inorganic powder having a Mohs' hardness of from 3 to 4.5, a friction coefficient can be stabilized against repeating-running. Moreover, a sliding guide pole is not scraped off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. They can be used alone or in combination of two or more.

The content of soft inorganic powders in a back coating layer is preferably from 10 to 140 weight parts, more preferably from 35 to 100 weight parts, based on 100 weight parts of the carbon black.

By the addition of a hard inorganic powder having a Mohs' hardness of from 5 to 9, the strength of a back coating layer is increased and running durability is improved. When such hard inorganic powders are used together with carbon blacks and the above-described soft inorganic powders, deterioration due to repeating sliding is reduced and a strong back coating layer can be obtained. Appropriate abrasive capability is imparted to a back coating layer by the addition of hard inorganic powders and the adhesion of scratched powders to a tape guide pole is reduced. In particular, when a hard inorganic powder is used in combination with a soft inorganic powder, sliding characteristics against a guide pole having a rough surface is improved and the stabilization of a friction coefficient of a back coating layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromium oxide ($Cr_2O_3$). These powders may be used alone or in combination. Of the above powders, alpha-iron oxide and alpha-alumina are preferred. The content of hard inorganic powders in a back coating layer is generally from 3 to 30 weight parts, preferably from 3 to 20 weight parts, based on 100 weight parts of the carbon black.

When soft inorganic powders and hard inorganic powders are used in combination in a back coating layer, it is preferred to use them selectively such that the difference of hardness between soft and hard inorganic powders is 2 or more, more preferably 2.5 or more, and particularly preferably 3 or more.

It is preferred that the above-described two kinds of inorganic powders each having specific average particle size and different Mohs' hardness and the above-described two kinds of carbon blacks each having different specific average particle size are contained in a back coating layer.

Lubricants may be contained in a back coating layer. Lubricants can be arbitrarily selected from among those which can be used in a lower layer or a magnetic layer as described above. The content of lubricants added to a back coating layer is generally from 1 to 5 weight parts based on 100 weight parts of the binder.

Support

Supports for use in the present invention are not particularly limited but they are substantially nonmagnetic and flexible supports, preferably the surface properties of which are controlled as described above. The examples of supports which can be used in the present invention include well-known films such as polyesters (e.g., polyethylene terephthalate and polyethylene naphthalate), polyolefins, cellulose triacetate, polycarbonate, polyamide (including aliphatic polyamide and aromatic polyamide such as aramid), polyimide, polyamideimide, polysulfone, and polybenzoxazole. Highly strong supports such as polyethylene naphthalate and polyamide are preferably used. If necessary, a lamination type support as disclosed in JP-A-3-224127 can be used to vary the surface roughnesses of a magnetic layer and a base. Supports may be subjected to surface treatments, such as corona discharge treatment, plasma treatment, easy adhesion treatment, heat treatment, and dust removing treatment in advance. It is also possible to use an aluminum or glass substrate as a support in the present invention.

For attaining the object of the present invention, it is preferred to use a support having a central plane average surface roughness (Ra) of 8.0 nm or less, preferably 4.0 nm or less, and more preferably 2.0 nm or less, measured by "TOPO-3D" (a product of WYKO Co., Ltd., U.S.A.). It is preferred that a support not only has a small central plane average surface roughness but also is free from coarse protrusions having a height of 0.5 µm or more. Surface roughness configuration is freely controlled by the size and the amount of fillers added to a support. The examples of such fillers include acryl-based organic fine powders, as well as oxides or carbonates of Ca, Si and Ti. A support for use in the present invention preferably has a maximum height (Rmax) of 1 µm or less, ten point average roughness (Rz) of 0.5 µm or less, central plane peak height (Rp) of 0.5 µm or less, central plane valley depth (Rv) of 0.5 µm or less, central plane area factor (Sr) of from 10 to 90%, and average wavelength (λa) of from 5 to 300 µm. For obtaining desired electromagnetic characteristics and durability, surface protrusion distribution of a support can be controlled arbitrarily by fillers, e.g., the number of protrusions having sizes of from 0.01 to 1 µm can be controlled each within the range of from 0 to 2,000 per 0.1 mm².

A support for use in the present invention has an F-5 value of preferably from 5 to 50 kg/mm² (49 to 490 MPa), a thermal shrinkage factor of a support at 100° C. for 30 minutes of preferably 3% or less, more preferably 1.5% or less, and a thermal shrinkage factor at 80° C. for 30 minutes of preferably 1% or less, more preferably 0.5% or less. A support has a breaking strength of from 5 to 100 kg/mm² (=about 49 to 980 MPa), an elastic modulus of from 100 to 2,000 kg/mm² (=about 0.98 to 19.6 GPa), a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of a support with difference of 10% or less.

Producing Method

Processes of preparing magnetic layer and lower layer coating solutions for use in the magnetic recording medium of the present invention comprise at least a kneading step, a dispersing step and, optionally, blending steps to be carried out before and/or after the kneading and dispersing steps. Any of these steps may be composed of two or more separate stages. Materials such as a ferromagnetic powder, a nonmagnetic powder, a binder, a carbon black, an abrasive, an antistatic agent, a lubricant and a solvent for use in the present invention may be added in any step at any time. Each material may be added in two or more separate steps. For example, polyurethane can be added dividedly in a kneading step, a dispersing step, or a blending step for adjusting viscosity after dispersion. For achieving the object of the present invention, the above steps can be performed partly with conventional techniques. Powerful kneading machines such as an open kneader, a continuous kneader, a pressure kneader or an extruder is preferably used in a kneading step. When a kneader is used, a magnetic powder or a nonmagnetic powder and all or a part of a binder (preferably 30% or more of the total binders) are kneading-treated in the range of from 15 parts to 500 mass parts per 100 mass parts of the magnetic powder. Details of kneading are disclosed in JP-A-1-106338 and JP-A-1-79274. When a magnetic layer solution and a lower layer solution are dispersed, glass beads can be used but dispersing media having a high specific gravity are preferably used, e.g., zirconia beads, titania beads and steel beads are suitable for this purpose. Optimal particle size and packing density of these dispersing media should be selected. Known dispersing apparatuses can be used in the present invention.

The following methods are preferably used for coating the magnetic recording medium having a multilayer construction of the present invention. As the first method, a lower layer is coated by any of gravure coating, roll coating, blade coating, and extrusion coating apparatuses, which are ordinarily used in the coating of a magnetic coating solution, and then an upper layer is coated while the lower layer is still wet by means of a support pressing type extrusion coating apparatus as disclosed in JP-B-1-46186 (the term "JP-B" as used herein means an "examined Japanese patent publication")), JP-A-60-238179 and JP-A-2-265672. As the second method, an upper layer and a lower layer are coated almost simultaneously using a coating head equipped with two slits for feeding coating solution as disclosed in JP-A-63-88080, JP-A-2-17971 and JP-A-2-265672. As the third method, an upper layer and a lower layer are coated almost simultaneously using an extrusion coating apparatus equipped with a backup roll as disclosed in JP-A-2-174965. For preventing the electromagnetic characteristics of the magnetic recording medium from deteriorating due to agglomeration of magnetic powders, it is preferred to give shear to the coating solution in a coating head by the methods as disclosed in JP-A-62-95174 and JP-A-1-236968. With respect to the viscosity of a coating solution, the range of the numeric values disclosed in JP-A-3-8471 is necessary to be satisfied. For realizing the constitution of the present invention, a successive multilayer coating method of coating a lower layer, drying the lower layer and successively coating a magnetic layer on the lower layer can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without performing orientation using orientating apparatus, but it is preferred to use well-known random orientation apparatuses, such as disposing cobalt magnets diagonally and alternately or applying an alternating current magnetic field using a solenoid. Isotropic orientation in ferromagnetic metal powders is in general preferably in-plane two dimensional random orientation, but it may be three dimensional random orientation having perpendicular factors. Hexagonal ferrites in general have an inclination for three dimensional random orientation of in-plane and in the perpendicular direction but it can be made in-plane two dimensional random orientation. It is also possible to impart to hexagonal ferrites isotropic magnetic characteristics in the circumferential direction by perpendicular orientation using well-known methods, e.g., using heteropolar-facing magnets. Perpendicular orientation is preferred particularly when a disc is used for high density recording. Circumferential orientation can be performed using spin coating.

In the case of a magnetic tape, orientation is performed in the machine direction using a cobalt magnet and a solenoid. In orientation, it is preferred that the drying position of the coated film can be controlled by controlling the temperature and the amount of drying air and coating velocity. Coating velocity is preferably from 20 to 1,000 m/min. and the temperature of drying air is preferably 60° C. or more. Appropriately preliminary drying can also be performed before entering a magnet zone.

The magnetic recording medium is generally subjected to calendering treatment after coating and drying. Use of heat resisting plastic rollers such as epoxy, polyimide, polyamide and polyimideamide, or metal rollers is effective for calendering treatment. Metal rollers are preferably used for the treatment particularly when magnetic layers are coated on both surface sides. Treatment temperature is preferably 50° C. or more, and more preferably 100° C. or more. Linear pressure is preferably 200 kg/cm (196 kN/m) or more, and more preferably 300 kg/cm (294 kN/m) or more.

Physical Properties

Saturation magnetic flux density of the magnetic layer of the magnetic recording medium according to the present invention is preferably from 0.1 to 0.3 T. The coercive force (Hc) of the magnetic layer is preferably from 159 kA/m (2,000 Oe) to 398 kA/m (5,000 Oe), more preferably from 159 to 239 kA/m (2,000 to 3,000 Oe). Coercive force distribution is preferably narrow, and SFD is preferably 0.6 or less. When the magnetic recording medium is a disc, a squareness ratio is from 0.45 to 0.55 in the case of random orientation, from 0.5 to 0.64 in the case of two dimensional random orientation, and when the magnetic recording medium is an oriented tape, a squareness ratio is 0.5 or more, and in the case of perpendicular orientation, a squareness ratio is 0.5 or more.

The magnetic recording medium in the present invention has a friction coefficient against head at temperature of from -10° C. to 40° C. and humidity of from 0% to 95% of 0.5 or less, preferably 0.3 or less, a surface inherent resistivity of the magnetic surface of preferably from 104 to 1012 ohm/sq, a charge potential of preferably from -500 V to +500 V, an elastic modulus at 0.5% elongation of the magnetic layer of preferably from 100 to 2,000 kg/mm$^2$ (0.98 to 19.6 GPa) in every direction of in-plane, a breaking strength of preferably from 10 to 70 kg/cm$^2$ (98 to 686 MPa), an elastic modulus of preferably from 100 to 1,500 kg/mm$^2$ (0.98 to 14.7 GPa) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of the magnetic layer (the maximum of loss elastic modulus by dynamic visco-elasticity measurement at 110 Hz) is preferably from 50° C. to 120° C., and that of the lower nonmagnetic layer is preferably from 0° C. to 100° C. The loss elastic modulus is preferably within the range of from $1 \times 10^9$ to $8 \times 10^{10}$ μN/cm$^2$, and loss tangent is preferably 0.2 or less. If loss tangent is too great, adhesion failure is liable to occur. These thermal and mechanical characteristics are preferably almost equal in every direction of in-plane of the medium within difference of 10% or less. The residual amount of solvent in the magnetic layer is preferably 100 mg/m$^2$ or less, more preferably 10 mg/m$^2$ or less. The void ratio is preferably 30% by volume or less, more preferably 20% by volume or less, with both of the nonmagnetic layer and the magnetic layer. The void ratio is preferably smaller for obtaining high output but in some cases a specific value should be preferably secured depending upon purposes. For example, in a disc-like medium which is repeatedly used, large void ratio contributes to good running durability in many cases.

The magnetic layer preferably has a central plane average surface roughness (Ra) of 4.0 nm or less, preferably 3.8 nm or less, more preferably 3.5 nm or less, on measuring an area of about 250 μm×250 μm using "TOPO-3D" (a product of WYKO Co., Ltd., U.S.A.). The magnetic layer for use in the present invention preferably has a maximum height (Rmax) of 0.5 μm or less, a ten point average roughness (Rz) of 0.3 μm or less, a central plane peak height (Rp) of 0.3 μm or less, a central plane valley depth (Rv) of 0.3 μm or less, a central plane area factor (Sr) of from 20% to 80%, and an average wavelength (λa) of from 5 to 300 μm. It is preferred to optimize electromagnetic characteristics and friction coefficient by setting surface protrusions of the magnetic layer within the above described range. They can be easily controlled by controlling the surface property by fillers in the support, controlling the particle size and the amount of the magnetic powders added to the magnetic layer, or varying the surface shape of rollers used in the calendering treatment. Curling is preferably within the range of ±3 mm.

In the magnetic recording medium according to the present invention, these physical properties in the lower layer and the magnetic layer can be varied according to purposes. For example, the elastic modulus of the magnetic layer is made higher to improve running durability and at the same time the elastic modulus of the lower layer is made lower than that of the magnetic layer to improve the head touching of the magnetic recording medium.

EXAMPLE

The present invention will be described in detail below with reference to specific examples, but the present invention should not be construed as being limited thereto. In the examples, "part" means "mass part" unless otherwise indicated.

Preparation of Coating Solution

| Magnetic coating solution | |
|---|---|
| Barium ferrite magnetic powder | 100 parts |
| Average tabular diameter: 30 nm | |
| Average tabular thickness: 10 nm | |
| Average particle volume: 5,800 nm$^3$ | |
| Proportion of particles having a tabular diameter of 10 nm or less: 6% | |
| Hc: 183 kA/m | |
| σs: 50 A · m$^2$/kg | |
| Specific surface area (S$_{BET}$): 65 m$^2$/g | |
| Vinyl chloride copolymer | 10 parts |
| MR110 (manufactured by Nippon Zeon Co., Ltd.) | |
| Polyurethane resin | 5 parts |
| UR 8200 (manufactured by Toyobo Co., Ltd.) | |
| alpha-Alumina (particle size: 0.2 μm) | 5 parts |
| HIT55 (manufactured by Sumitomo Chemical | |

-continued

| | |
|---|---|
| Co., Ltd.) Average particle size: 0.2 μm | |
| Carbon black | 1 part |
| #55 (manufactured by Asahi Carbon Co., Ltd.) Average particle size: 0.075 μm Specific surface area ($S_{BET}$): 35 m$^2$/g DBP oil absorption amount: 81 ml/100 g pH: 7.7 Volatile content: 1.0% | |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Nonmagnetic coating solution 1 (for lower layer, disc) | |
| Nonmagnetic powder, TiO$_2$, crystal system rutile Average particle size: 0.035 μm Specific surface area ($S_{BET}$): 40 m$^2$/g pH: 7 TiO$_2$ content: 90% or more DBP oil absorption amount: 27 to 38 ml/100 g Surface-covering compound: Al$_2$O$_3$, 8 mass % | 80 parts |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |
| Nonmagnetic coating solution 2 (for lower layer, tape) | |
| Nonmagnetic powder, TiO$_2$, crystal system rutile Average particle size: 0.035 μm Specific surface area ($S_{BET}$): 40 m$^2$/g pH: 7 TiO$_2$ content: 90% or more DBP oil absorption amount: 27 to 38 ml/100 g Surface-covering compound: Al$_2$O$_3$, 8 mass % | 80 parts |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 1 part |
| Stearic acid | 3 parts |
| Methyl ethyl ketone/cyclohexanone (8/2 mixed solvent) | 250 parts |

Preparation Method 1: Disc

Example 1

With each of the above compositions of the coating solutions for forming a magnetic layer and a lower layer, components were blended in a kneader, and then dispersed in a sand mill by circulating ten times with zirconia beads. Polyisocyanate was added to each resulting coating solution, in an amount of 10 parts to the lower layer coating solution, and in an amount of 10 parts to the magnetic layer coating solution. Further, 40 parts of cyclohexanone was added to each solution, and each solution was filtered through a filter having an average pore diameter of 1 μm to obtain coating solutions for forming a lower layer and a magnetic layer.

The obtained lower layer-forming coating solution and magnetic layer-forming coating solution were simultaneously multilayer-coated on one side of a polyethylene terephthalate support having a thickness of 62 μm, a central plane average surface roughness of 3 nm, and protrusion density P in number of 0.05/mm$^2$. The lower layer-forming coating solution was coated in a dry thickness of 1.5 μm, immediately thereafter the magnetic layer-forming coating solution was coated on the lower layer in a dry thickness of 0.2 μm. The other side of the support was also subjected to multilayer coating in the same manner, orientation, drying, and calendering treatment with calenders of seven stages at 90° C. and linear pressure of 300 kg/cm (294 kN/m). The obtained web was punched to a disc of 3.7 inches and the disc was subjected to surface treatment by abrasives, thus a disc medium was obtained.

Examples 2 to 5 and Comparative Examples 1 to 3

Each disc medium was obtained in the same manner as in Example 1 except for changing the protrusion density of the support, the circulating number of the magnetic solution for dispersion, the temperature and the linear pressure of calendering treatment as shown in Table 1 below.

Preparation Method 2: Computer Tape

Example 11

With each of the above compositions of the coating solutions for forming a magnetic layer and a lower layer, components were blended in a kneader, and then dispersed in a sand mill by circulating ten times with zirconia beads. Polyisocyanate was added to each resulting coating solution, 2.5 parts to the lower layer coating solution, and 3 parts to the magnetic layer coating solution. Further, 40 parts of cyclohexanone was added to each solution, and each solution was filtered through a filter having an average pore diameter of 1 μm to obtain coating solutions for forming a lower layer and a magnetic layer.

The above-obtained lower layer-forming coating solution and magnetic layer-forming coating solution were simultaneously multilayer-coated on an aramid support (trade name: Mictoron) having a thickness of 4.4 μm, a central plane average surface roughness of 2 nm, and protrusion density P in number of 0.05/mm$^2$. The lower layer-forming coating solution was coated in a dry thickness of 1.7 μm, immediately thereafter the magnetic layer-forming coating solution was coated on the lower layer in a dry thickness of 0.15 μm. Both layers were subjected to orientation with a cobalt magnet having a magnetic force of 0.6 T and a solenoid having a magnetic force of 0.6 T while both layers were still wet. After drying, the coated layers were subjected to calendering treatment through a calender of 7 stages comprising metal rolls alone at 90° C., linear pressure of 300 kg/cm (294 kN/m) and a velocity of 200 m/min. Subsequently, a back coating layer (100 parts of a carbon black having an average particle size of 17 nm, 80 parts of calcium carbonate having an average particle size of 40 nm, and 5 parts of alpha-alumina having an average particle size of 200 nm were dispersed in a nitrocellulose resin, a polyurethane resin, and a polyisocyanate) having a thickness of 0.5 μm was coated. The obtained web was slit to a width of 3.8 mm. The magnetic layer surface of the thus-obtained strip was cleaned with a tape cleaning apparatus having delivery and winding-up movement of a slit product to which a nonwoven fabric and a razor blade are attached so as to be pressed against the surface of the tape. Thus, a tape sample was obtained.

Examples 12 to 15 and Comparative Examples 11 to 13

Each tape sample was obtained in the same manner as in Example 11 except for changing the protrusion density of the support, the circulating number of the magnetic solution for dispersion, the temperature and the linear pressure of calendering treatment as shown in Table 2 below.

Performances of the thus-prepared magnetic discs and computer tapes were evaluated according to the methods shown below and the results obtained are shown in Tables 1 and 2 below.

(1) Friction Coefficient

A sample tape was brought into contact (at a winding angle of 180°) with the following two kinds of poles (surface roughness (Ra): 0.06 to 0.08 μm; measured by a contact type roughness meter, a cutoff value of 0.25 μm) at 23° C., 70% RH with applying 20 g of tensile force (T1). The sample tape was retained in horizontal in a load cell via a guide member, and tensile force (T2) required to run the sample tape at a velocity of 14 mm/sec in the horizontal direction on the above condition was measured.
(1) stainless steel pole: SUS 420J pole
(2) resin pole: POM (polyoxymethylene) Juracon M207 pole
A friction coefficient μ value was obtained according to the following equation using the above-measured value.

$$\mu = (1/\pi) \cdot \ln(T2/T1)$$

(2) Power Spectrum of Density (i.e., Intensity of Spatial Frequency)

The surface roughness of the area of 250 μm×250 μm of a sample tape was measured using a non-contact type surface roughness meter TOPO3D (a product of WYKO, U.S.A.), and the intensities of spatial frequency of 100/mm and 500/mm were obtained by frequency analysis of the obtained value.

(3) Electromagnetic Characteristics of Disc

Output: Reproduction output was measured by a disc tester manufactured by Kokusai Denshi Kogyo Co., Ltd. (the late Tokyo Engineering Co., Ltd.) and an SK606B type disc evaluation apparatus by using a metal-in-gap head having a gap length of 0.3 μm. After recording at the position of radius of 24. 6 mm by a recording wavelength of 90 KFCI, the reproduction output of a head amplifier was measured by an oscilloscope 7633 type manufactured by Techtronics Co., Ltd.

S/N ratio: After the disc used for measuring reproduction output was erased by DC, and reproduction output (noise) was measured by a TR4171 type spectrum analyzer (manufactured by Advantes Co., Ltd.). −20 log (noise/reproduction output) was taken as an S/N ratio and represented as a relative value taking the S/N ratio of sample No. 1 as 0 dB.

(4) Electromagnetic Characteristics of Tape

C/N ratio (tape): Signals were recorded with a recording head (MIG, gap length: 0.15 μm, a track width: 18 μm, 1.8 T) and an MR head for reproduction (a shield type head, gap length between shields: 0.2 μm, a track width: 4 μm) being attached to a drum tester. Single frequency signals of relative speed of head-medium of 10 m/sec and recording wavelength of 0.2 μm (50 MHz) were recorded, and the reproduced signals were analyzed by frequency with a spectrum analyzer (a product manufactured by Shibasoku K.K.), and the ratio of the output voltage of the above single frequency signals to the voltage of noise 1 MHz apart was taken as a C/N ratio. Bias current was applied to the MR head at reproduction so that the reproduction output became maximum.

(5) Durability a) Durability of Magnetic Disc

A floppy disc drive (ZIP100, a product of Iomega Corp., U.S.A., rotation number: 2,968 rpm) was used. A head was fixed at the position of radius of 38 mm, and a sample disc was run under the following thermo-cycle condition, which was taken as one cycle. The point when a scratch was visually observed on the surface of the sample was taken as NG, and the durability was expressed as a relative value.

Thermo-Cycle Flow

25° C., 50% RH, 1 hr→(temperature up, 2 hr)→60° C., 20% RH, 7 hr→(temperature down, 2 hr)→25° C., 50% RH, 1 hr→(temperature down, 2 hr)→5° C., 10% RH, 7 hr→(temperature up, 2 hr)→(this cycle was repeated).

b) Durability of Computer Tape

Predetermined signals were recorded by using a DDS drive. The disc was run at 50C., 10% RH while monitoring reproduced signals, and the point when the initial reproduction output reached 70% was taken as NG, and the durability was expressed as a relative value.

TABLE 1

| | Magnetic Disc | | | | | | | |
|---|---|---|---|---|---|---|---|---|
| | Ex. 1 | Ex. 2 | Ex. 3 | Ex. 4 | Ex. 5 | Comp. Ex. 1 | Comp. Ex. 2 | Comp. Ex. 3 |
| Magnetic powder | | | | | | | | |
| Kind | BaFe | BaFe | BaFe | BaFe | BaFe | BaFe | BaFe | BaFe |
| Av. tabular diameter (nm) | 30 | 35 | 17 | 30 | 30 | 60 | 60 | 30 |
| Support protrusion density P (number/mm²) | 0.05 | 0.05 | 0.05 | 0.3 | 0.3 | 0.05 | 0.008 | 0.008 |
| Circulating number of magnetic solution for dispersion | 10 | 10 | 10 | 10 | 15 | 10 | 10 | 10 |
| Calendering temperature (° C.) | 90 | 90 | 90 | 90 | 95 | 90 | 90 | 90 |
| Linear pressure (kg/cm) | 300 | 300 | 300 | 300 | 400 | 300 | 300 | 300 |
| M Value | | | | | | | | |
| SUS μ value | 0.33 | 0.28 | 0.27 | 0.25 | 0.28 | 0.35 | 0.51 | 0.55 |
| POM μ value | 0.33 | 0.29 | 0.26 | 0.25 | 0.28 | 0.35 | 0.50 | 0.57 |

TABLE 1-continued

Magnetic Disc

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Power spectrum of density (nm³) | | | | | | | | |
| 100/mm | 4,500 | 6,500 | 7,100 | 8,000 | 5,000 | 14,000 | 4,000 | 5,000 |
| 500/mm | 280 | 420 | 380 | 450 | 290 | 700 | 200 | 40 |
| Electromagnetic characteristics (db) S/N ratio | 45 | 35 | 32 | 30 | 42 | 0 | 12 | 43 |
| Durability (%) | 100 | 100 | 100 | 130 | 120 | 100 | 80 | 60 |

TABLE 2

Magnetic Tape

|  | Ex. 11 | Ex. 12 | Ex. 13 | Ex. 14 | Ex. 15 | Comp. Ex. 11 | Comp. Ex. 12 | Comp. Ex. 13 |
|---|---|---|---|---|---|---|---|---|
| Magnetic powder | | | | | | | | |
| Kind | BaFe | BaFe | BaFe | BaFe | BaFe | BaFe | BaFe | BaFe |
| Av. tabular diameter (nm) | 30 | 35 | 17 | 30 | 30 | 60 | 60 | 30 |
| Support protrusion density P (number/mm²) | 0.05 | 0.05 | 0.05 | 0.3 | 0.3 | 0.05 | 0.008 | 0.008 |
| Circulating number of magnetic solution for dispersion | 10 | 10 | 10 | 10 | 15 | 10 | 10 | 10 |
| Calendering temperature (° C.) | 90 | 90 | 90 | 90 | 95 | 90 | 90 | 90 |
| Linear pressure (kg/cm) | 300 | 300 | 300 | 300 | 400 | 300 | 300 | 300 |
| M Value | | | | | | | | |
| SUS $\mu$ value | 0.36 | 0.30 | 0.29 | 0.28 | 0.31 | 0.39 | 0.51 | 0.58 |
| POM $\mu$ value | 0.36 | 0.31 | 0.26 | 0.27 | 0.30 | 0.39 | 0.50 | 0.58 |
| Power spectrum of density (nm³) | | | | | | | | |
| 100/mm | 4,300 | 6,400 | 6,900 | 7,700 | 4,800 | 12,000 | 3,600 | 5,000 |
| 500/mm | 240 | 400 | 350 | 400 | 250 | 600 | 200 | 30 |
| Electromagnetic characteristics (dB) C/N ratio | 55 | 35 | 32 | 30 | 42 | 0 | 12 | 53 |
| Durability (%) | 100 | 100 | 100 | 130 | 120 | 100 | 80 | 40 |

Since the particle sizes of BaFe in the samples in Comparative Examples 1 and 11 are great, the magnetic layer surfaces are coarse, the $\mu$ values are low and the durability can be ensured, but low in S/N or C/N ratio.

Comparative Examples 2 and 12 are the examples of using BaFe particles of large sizes, and S/N or C/N ratio is better than that in Comparative Examples 1 and 11 even when supports having low protrusion density are used but not in a satisfactory level, and the durability is not also ensured.

The samples in Comparative Examples 3 and 13 have smooth surfaces and S/N or C/N ratio is similar to that of the sample in Example 1, but $\mu$ values are high and the durability cannot be ensured.

Samples in Examples 1 to 5 and 11 to 15 are well-balanced in S/N or C/N ratio and the durability as compared with the samples in Comparative Examples.

EFFECT OF THE INVENTION

As shown in the Examples, the present invention can provide a magnetic recording medium excellent in S/N or C/N ratio and durability by specifying the average tabular diameter of a hexagonal ferrite powder and the friction coefficient against SUS and POM poles.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having thereon a substantially nonmagnetic lower layer and a magnetic layer containing a ferromagnetic hexagonal ferrite powder dispersed in a binder provided in this order, wherein the average tabular diameter of the ferromagnetic hexagonal ferrite powder is from 10 to 40 nm, the friction coefficient of the magnetic layer against an SUS420J pole and a polyoxymethylene (POM) pole is from 0.15 to 0.50, the support has on the surface protrusions having a height of 0.1 to 0.5 $\mu$m in a number of from 0.01 to 0.5/mm² and the magnetic recording medium is a magnetic recording medium for reproduction with a magneto-resistance type magnetic head.

2. The magnetic recording medium as in claim 1, wherein the intensity of spatial frequency of 100/mm which is obtained by frequency analysis of the surface roughness of the magnetic layer is 10,000 nm³ or less, and the intensity of spatial frequency of 500/mm is from 50 to 500 nm³.

* * * * *